May 3, 1960     F. D. JONES     2,934,879
CORN HARVESTER AND STALK CUTTERS THEREFOR
Filed April 23, 1956     2 Sheets-Sheet 1

INVENTOR.
FRANK JONES

ATTORNEYS

May 3, 1960  F. D. JONES  2,934,879
CORN HARVESTER AND STALK CUTTERS THEREFOR
Filed April 23, 1956  2 Sheets-Sheet 2

INVENTOR.
FRANK JONES
BY
ATTORNEYS

United States Patent Office 2,934,879
Patented May 3, 1960

2,934,879

CORN HARVESTER AND STALK CUTTERS THEREFOR

Frank D. Jones, Moline, Ill., assignor, by mesne assignments, to Deere & Company, a corporation of Delaware Application April 23, 1956, Serial No. 579,823

10 Claims. (Cl. 56—63)

This invention relates to a corn harvesting machine and more particularly to the means for removing the ears of corn from the standing stalks.

One of the primary objections to the present day or more modern corn pickers is that considerable shelling of the corn occurs in the operation of removing the ears from the stalks. In the more conventional type corn pickers presently in use, snapping or removing of the ears occurs by guiding the stalks between a pair of fore-and-aft extending snapping rolls which operate to engage the stalks and drive them through the snapping rolls to cause the ears of corn on the stalks to be severed upon coming in contact with the snapping rolls, it being physically impossible for the ears of corn to pass between the snapping rolls. While in theory the ears of corn are supposed to guide over the snapping rolls, in practice the tip or butt end will tend to wedge between the rolls and consequently considerable of the ear may be shelled before the ear seats itself properly on the rolls. Also, when harvesting a field of extremely dry or mature corn, the mere contact or dropping of the ears on the snapping rolls will cause kernels to be dislodged from the ear. This is particularly so inasmuch as in many of the conventional type corn pickers the snapping rolls will also act to remove some of the husks from the ears, thus making the ears more susceptible to incidental shelling upon their coming in contact with the snapping rolls.

It is, therefore, the purpose of this invention to provide a new and novel type of corn harvester which does not make use of the presently conventional type of snapping rolls for removing the ears from the stalks, nor does the removal of the ears from the stalks include a means which would operate to remove the husks from the ears before they reach the husking unit. Husking at the latter unit is desirable inasmuch as suitable collecting units may be provided for saving incidental kernels of corn which may be loosened from the ear in the husking operation.

It is the primary object of this invention to provide a new and novel method of removing ears of corn from the stalks comprising basically cutting elements which cut the stalks into three portions, a central ear bearing portion, an upper waste portion, and a lower portion which remains attached to the ground. Conveyor means are provided for collecting the ear bearing portions and moving them to the corn husking unit.

It is also an object of this invention to provide with the above type of severing unit a means for positioning each stalk of corn as it moves through the harvesting unit into a position whereby the ear bearing portion is substantially uniformly placed relative to the cutting elements.

It is still a further object of the invention to provide with the above ear severing apparatus a conveyor means which includes both an upper conveyor for discarding the upper waste portion of the stalks outwardly of the harvesting unit and a lower conveyor for collecting the central ear-bearing portion and moving it to a suitable ear treating or husking unit.

These and other objects of the invention will become apparent to those skilled in the art upon a full understanding of the invention as herein disclosed and as shown in the accompanying drawings.

Figure 1:
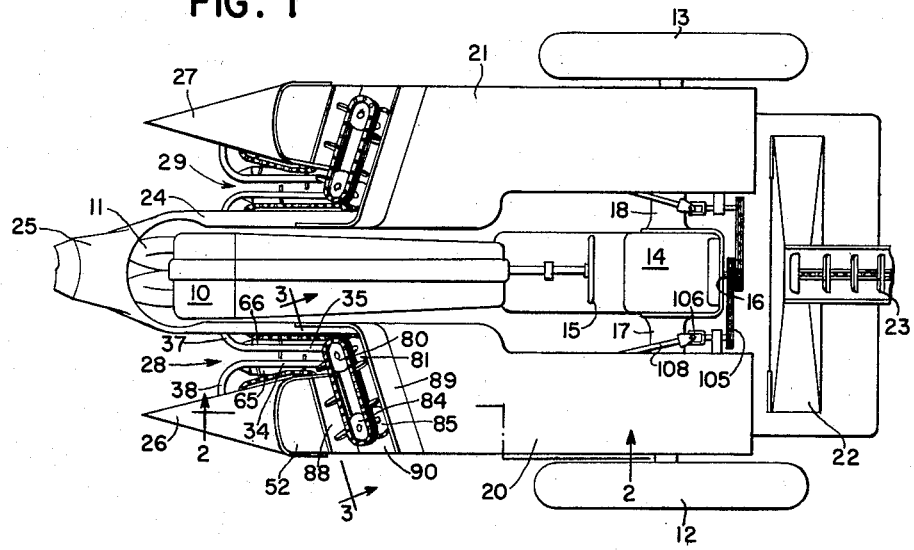
Figure 1 is a plan view of a tractor and a portion of the harvesting unit which incorporates the principles of this invention.

For convenience of description, the invention is disclosed in the form of a two-row tractor-mounted corn picker. It should be recognized that the basic structure using the principles of the invention would operate in any type of corn harvester, it being unimportant as to the type of motive power provided for its movement over the field of corn or for the operation of the parts of the harvester. The tractor is a conventional tricycle type tractor having a longitudinally extending body 10 supported at its forward end by front wheels 11 and at its rearward end by left and right transversely spaced rear wheels 12, 13. An operator's station includes a tractor seat 14 provided at the rear of a suitable steering wheel 15. A standard type power take-off shaft 16 is centrally positioned on the tractor and extends rearwardly from beneath the seat 14.

The tractor also has left- and right-hand axle housings 17, 18 containing the rear axles which operate to space the rear wheels 12, 13 from the tractor body 10. Directly above and mounted on the axle housing 17 is a crop-treating or husking unit 20 of the left-hand harvesting unit. Mounted directly over and mounted on the axle housing 18 is a crop-treating or husking unit 21 of the right-hand harvesting unit. The left- and right-hand harvesting units 20, 21 receive crops from the forward crop severing unit and deliver the crops in a treated or husked condition rearwardly to a transverse hopper 22 which places the corn in the lower end of a centrally positioned and rearwardly extending discharge elevator 23. The husking units 20, 21, the hopper 22, and the elevator 23 may be considered, for purposes of this invention, to be of a conventional type and details are therefore omitted. However, specific details of similar husking, hopper, and elevator units are shown in U.S. Patent 2,622,382.

The harvesting unit comprises supporting structure including external shielding 24 positioned alongside opposide sides of the tractor body 10 and which converges at its forward end forwardly of the tractor front wheels 11 to a central divider point 25. Positioned outwardly from the central dividing point 25 are left- and right-hand gathering points 26, 27, respectively, which are spaced laterally from the central shielding 24 to form gathering structure for moving the stalks into left and right stalk passages 28, 29, respectively. The shielding 24, divider point 25, and gathering points 26, 27 are supported by suitable framework, not shown in detail but indicated as a part of a main framework 30, which is mounted on the tractor to permit raising or lowering of the gathering units.

The left- and right-hand harvesting units are similar to one another with the exception of those obvious differences which are apparent due to the relative positioning of the units to the tractor. Consequently, details of only the left-hand unit will be given.

It should also be understood that the crop treating units at the rear of the harvesters are shown as husking units only for purpose of illustration, and that other types of crop-treating or crop-collecting units could be substituted or added without departing from the basic invention.

Forming the stalk passage 28 are a pair of rigid elongated members or bars 34, 35 extending fore-and-aft and laterally spaced apart to permit the row of stalks to pass between. The rear end of the members 34, 35 are bolted as at 36 to the main frame 30. The forward ends of the bars or members 34, 35 are flared outwardly, as at 37, and inwardly, as at 38, respectively, to form at the forward end a passage throat conducive to guiding stalks into the passage 28. The forward ends of the members 34, 35 are also rigidly supported on the main frame 30.

On either side of the passage 28 are a pair of vertically spaced apart gathering chains. To the left of a passage 28 are upper and lower gathering chains 39, 40, respectively. The upper chain 39 is mounted over sprockets 41, 42, 43 which in turn are carried by sprocket shafts 44, 45, and 46, respectively. Also mounted on the shafts 44, 45, 46 are lower sprockets 47, 48, 49, on which the lower gathering chain 40 is mounted. The inner runs of the gathering chains 39, 40 extend through upper and lower slots 50, 51 respectively, in outer shielding 52 which is a rearward extension of the outer dividing housing point 26.

Figure 2:
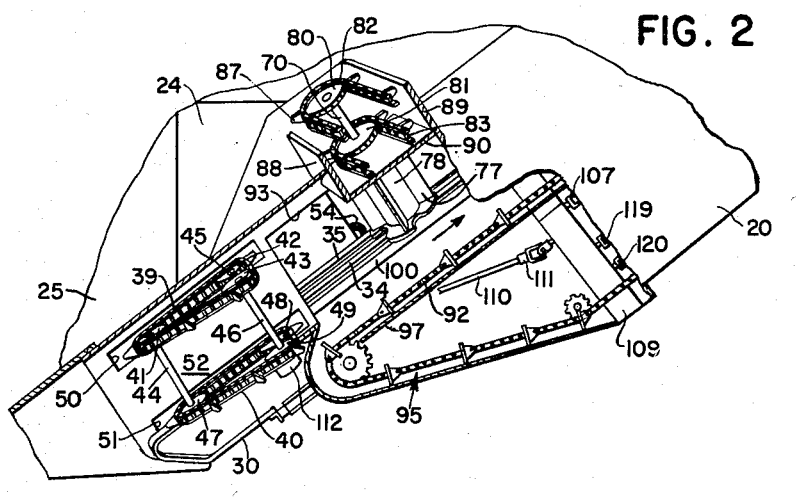
Figure 2 is an enlarged sectional view taken along the lines 2—2 of Fig. 1.

On the inner side of the passage 28 are upper and lower gathering chains 53, 54, respectively. The chains 53, 54 are mounted at their rear over a pair of rear sprockets 55, 56 which are fixed on a shaft 57 which in turn has its lower end supported in a gear housing 58 (see Fig. 3). The forward end of the ends of the gathering chains 53, 54 are mounted over idler sprockets which are carried on a shaft supported on the main frame 30. The latter sprockets and shafts are not shown, but any suitable mounting arrangement would suffice for purposes of this invention. Viewing Figs. 2 and 4, it becomes apparent that the sprocket shafts 44, 45, 46, and 57 are inclined forwardly and laterally outwardly relative to the horizontal thereby causing the gathering chains 39, 40, 53, 54 to be in planes at an angle to the horizontal. The lugs of the gathering chains 39, 40, 53, and 54 extend inwardly, relatively to the passage 28, of the elongated bars 34, 35 and obviously serve to drive the stalks rearwardly between the elongated bars.

Mounted beneath the bars 34, 35 on opposite sides of the passage 28 and on the main frame 30 is a pair of rotatable rolls 65, 66. The rolls 65, 66 are rotatably driven so that the inner adjacent portions of the rolls will move downwardly. The surface of the rolls 65, 66 are smooth and the rolls are spaced apart laterally to a degree in which stalks passing between the rolls will be drawn downwardly, but with a small amount of resistance against downward movement by the stalks, the rolls 65, 66 will rotatably slide against the stalks. This latter feature becomes important inasmuch, as will later be explained, the sliding action will prevent the ear of corn on the stalks from being prematurely severed or detached from the stalks.

Figure 4:
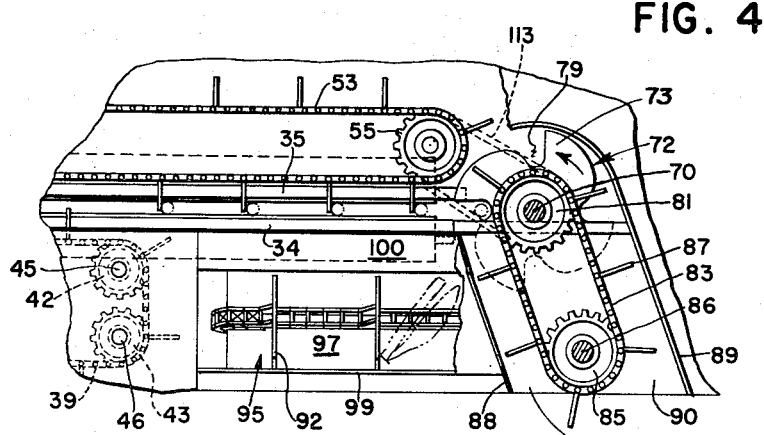
Figure 4 is a sectional view taken along the lines 4—4 of Figure 3.

Directly to the rear of the passage 28 is a driveshaft 70 which is parallel to the aforesaid sprocket shafts 44—46, and 57 and which is supported on the main frame 30 by means of a bearing housing fixed to the rigid bars or members 34, 35. Mounted on the lower portion of the shaft 70 is a cutting unit, indicated in its entirety by the reference numerals 72, composed of upper and lower cutting elements 73, 74, respectively, each of the cutting elements being divided into four segments, the leading edge of each segment being formed into a knife edge extending radially from the axis of the shaft 70, and the trailing edge extending from the outer end of the knife edge radially and angularly inwardly to where it continues into the knife edge of the next segment. As shown in Fig. 4, each of the segments form a pocket, as at 79, with the following segment for receiving the stalks moving through the passage 28. The guide bars 34, 35 pass beneath and adjacent to the lower cutting elements 74 of the cutting unit 72 and the adjacent portion of the bar 34 operates as a stationary knife cooperating with the cutting edges of the lower cutting element 74 to sever the stalks at that point. Fixed to the main frame 30 and extending above and adjacent to the upper cutting elements 73 is a stationary knife 75 which is bolted, as at 76, to the frame 30 and which extends forwardly and operates in conjunction with the cutting edges of the upper cutting element 73 to sever the stalks passing in the pockets 79 of the upper element.

Extending between the upper and lower cutting elements of the cutting unit 72 are four radially extending and vertically disposed plates 77, rigidly fixed to the elements 73, 74. The inner edges of the plate 77 are fixed to a vertical cylindrical shaped support 78.

Mounted on the upper end of the shaft 70 are upper and lower sprockets 80, 81, respectively, on which is mounted upper and lower chains 82, 83. The chains 82, 83 run transverse to the direction of travel and are mounted at their outer extremity on upper and lower sprockets 84, 85, respectively, which are journaled on an idler sprocket shaft 86. Lugs 87 extend outwardly from the chains 82, 83. Front and rear upright members 88, 89 are fixed to the shielding of the harvesting units and serve in conjunction with the lugs on the conveyor chains 82 and 83 as conveyor means for moving materials outwardly of the harvesting unit. Also fixed to the shielding of the harvesting unit is a lower housing plate 90 which rides adjacent to and beneath the lower conveyor chain 83. Thus, the chains 82, 83 are surrounded in three directions, being left open only from above.

Positioned outwardly of the stalk passage 28 and the cutting element 72 is a fore-and-aft extending elevator 95, commonly referred to as the first or husking elevator, and which for purposes of this invention is conventional and will not be shown or described in detail in the present disclosure, but which is so disclosed in the aforesaid U. S. Patent 2,622,382. The elevator comprises basically a flight type conveyor 91 having an upper run 92 adapted to receive ears of corn and deliver them to the husking bed. Surrounding the upper run 92 at its forward end is a trough-like housing 96 composed of a lateral portion 97 positioned under the upper run 92 and two upright portions 98, 99 on the inner and outer side of the run 92, respectively. The upright portions 98 are flanged inwardly as at 100 to lie adjacent or proximate to the lower cutting element of the cutting unit 72. An opening 93 is provided in the side plates of the harvester housing to permit passage of the ears from the severing portion to the discharge or husking elevator 95.

Driving mechanism for operating the corn harvesting unit is provided from the power take-off shaft 16 through the medium of a chain drive 105 which extends transversely from the center of the tractor. A pair of universal joints 106, 107 interconnected by a connecting rod or shaft 108 conveys the power from the chain drive 105 forwardly to a gear transmission encased in a transmission housing 109 (see Figs. 1, 2). Extending forwardly from the transmission housing 109 is a drive shaft 110 which is suitably connected by universal joint means at its front and rear ends, as at 111, ultimately to be connected to a bevel type gear arrangement enclosed in a gear housing 112 at the lower end of the sprocket shaft 45 which operates to drive the outer pair of gathering chains 39, 40. A similar drive arrangement, not shown, is provided to drive the inner pair of gathering chains 53, 54 through the gear housing 58.

Figure 5:
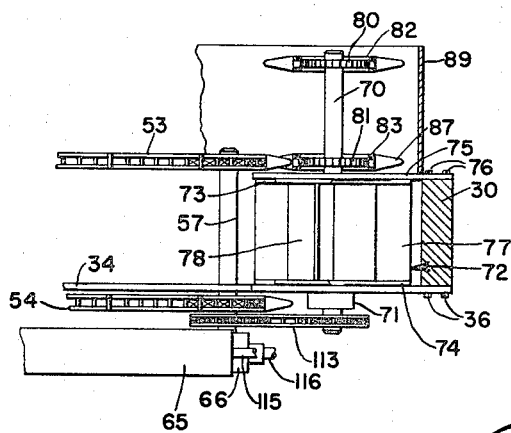
Figure 5 is a sectional view taken along the lines 5—5 of Figure 3.

A chain drive 113 (Figs. 4 and 5) interconnects the shafts 57 and 70. Rotation of the shaft 57 therefore causes rotation of the shaft 70 which in turn drives the cutting unit 72 and the upper conveying mechanism or conveyor chains 84, 85. The rolls 65, 66 have rearwardly extending drive shafts 115, 116, respectively, which are interconnected by spur gears, also not shown, but which are more or less a conventional method of driving rolls of this type. The shaft 115 extends rearwardly and enters the gear housing 109 (Fig. 2) where it is rotatably driven by suitable gearing within the housing. Other drive mechanism of the harvester is driven from the gear housing 109 by means of rearwardly extending shafts 119, 120 shown partially only in Fig. 2.

Figure 3:
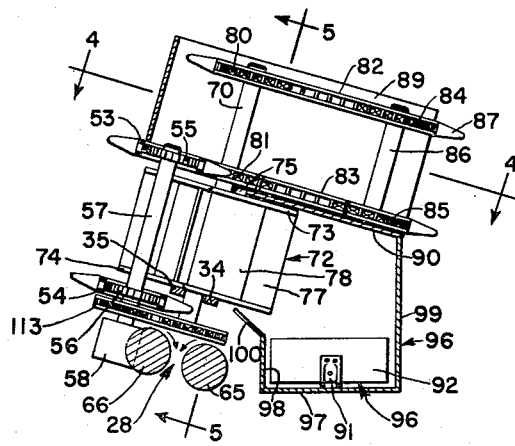
Figure 3 is an enlarged sectional view taken substantially along the lines 3—3 of Fig. 1. For clarity, portions of the housing have been removed.

The corn harvester operates in the following manner. The standing corn enters the machine as the unit is driven over the rows of corn. The gathering chains 53, 54 and 39, 40 assist in positioning the stalks as the stalks enter between the rigid elongated members 34, 35 and maintain the stalks in a substantially upright position, or to be more exact, in a position substantially parallel to the gathering chain drive shafts 44, 46, and 57. The positioning rolls 65, 66 rotating in the direction indicated by the arrows as shown in Fig. 3 operate to drive the stalks downwardly. As previously mentioned the positioning rolls 65, 66 apply only enough friction on the stalks to pull them down in a position in which the butt end of the ears come into contact with the guides or rigid members 34, 35. When the stalks and ears reach this latter position, the rolls will rotate without pulling the stalk down any further and thus the ears will not snap or be severed from the stalk in this particular operation. The gathering chains, in conjunction with the forward movement of the implement along the ground, will drive the stalks rearwardly to the rear end of the stalk passage 28 where they will be delivered by the inner gathering chains 53, 54 to the pockets 79 of the cutting unit 72. When the stalks reach this position in their rearward movement the rolls 65, 66 will by this time have positioned the ears of corn where they will abut the rigid members or bars 34, 35. The cutting elements 73, 74 of the cutting unit 72 will sever the stalks above and below the ears thereby dividing the stalks into three portions, an upper waste portion, a central or middle ear bearing portion, and a lower portion which remains attached to the ground.

The height of the plates 77 is substantially equal to the length of an unhusked ear of corn and thus the central or middle portion of the stalk is substantially the length of the adjacent ear of corn which is connected thereto. As the stalk is severed into its three portions, the plates 77 of the cutting element 72 will act as paddles to drive or convey the central or ear bearing portion outwardly. (See Fig. 4.) Since the axis of the cutting unit 72 is tipped toward the conveyor, gravity will also aid in moving or causing the ears to fall in the direction of the husking elevator 95 which will collect the central or ear bearing portions of the stalks and deliver them to the corn treating or husking unit of the harvesting machine. Thus, the paddles or plates 77 operate as a conveyor means for moving the ears of corn into the intake portion of the husking elevator.

The upper conveying means comprising the chain conveyors 82, 83 engage the upper portion of the stalks as they are severed and drive them outwardly of the unit to be discharged at one side of the corn harvesting machine. The upper conveyor housing 88—90 prevents intermingling of the waste portion of the stalk with the central ear bearing portions and causes the waste portions to be positively removed from the unit thereby aiding in the prevention of clogging the unit by the upper portions of the stalks.

While only one form of the invention has been shown, it should be recognized that other forms and variations, particularly pertaining to the details of the invention, could exist without departing basically from the broad general principles herein disclosed. It should therefore be understood that while the preferred embodiment of the invention has been described with the view of clearly and concisely illustrating the principles of the invention, it is desired not to so limit or narrow the invention beyond that which is claimed.

What is claimed is:
1. Harvesting mechanism on a corn harvester having a main frame adapted to move over a field of row-planted ear-bearing corn stalks comprising: a pair of elongated and longitudinally extending members mounted on the frame and spaced apart laterally to define a stalk passage, for successively receiving the stalks as the harvester moves forwardly, said passage being sufficiently narrow to prevent ears of corn from passing therebetween; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members; a pair of vertically spaced apart upper and lower cutting elements supported on the frame adjacent the passage, the lower of said elements being proximate to the elongated members and operative to sever the stalks adjacent the butt end of the ears, and the upper cutting element being spaced from and operative to sever the stalks substantially an ear-length from the lower cutting element, said cutting elements thereby dividing the stalk into a central ear-bearing portion, an upper portion, and a lower portion; and vertically spaced apart conveyor means on the frame including means therein separating upper and lower conveyors for preventing intermingling of materials in the respective conveyors, the upper conveyor including means therein for collecting and moving the upper portions of the stalks outwardly of the harvesting unit, the lower conveyor including means therein for collecting and moving the ear-bearing portions to a collecting unit.

2. Harvesting mechanism on a corn harvester having a main frame adapted to move over a field of row-planted ear-bearing corn stalks comprising: a pair of elongated and longitudinally extending members mounted on the frame and spaced apart laterally to define a stalk passage for successively receiving stalks as the harvester moves forwardly, said passage being sufficiently narrow to prevent ears of corn from passing therebetween; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members; a pair of vertically spaced apart upper and lower cutting elements supported on the frame adjacent the passage, the lower of said elements being operative to sever each of the stalks adjacent the butt end of the ear, and the upper cutting element being operative to sever each of the stalks substantially an ear-length from the lower cutting element, said cutting elements thereby dividing the stalk into a central ear-bearing portion, an upper portion, and a lower portion; and vertically spaced apart conveyor means including upper and lower conveyors respectively, the upper conveyor including means therein for collecting and moving the upper portions of the stalks outwardly of the harvesting unit, the lower conveyor including means therein for collecting and moving the ear-bearing portions to a collecting unit.

3. Harvesting mechanism on a corn harvester having a main frame adapted to move over a field of row-planted ear-bearing corn stalks comprising: a pair of elongated and longitudinally extending members mounted on the frame and spaced apart laterally to form a stalk passage, for successively receiving the stalks as the harvester moves forwardly, said passage being sufficiently narrow to prevent ears of corn from passing therebetween; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members; a pair of vertically spaced apart upper and lower cutting elements supported on the frame adjacent the passage, the lower of said elements being operative to sever each of the stalks adjacent the butt end of the ear, and the upper cutting element being operative to sever the stalk substantially an ear-length from the lower cutting element, said cutting elements thereby dividing the stalk into a central ear-bearing portion, an upper portion, and a lower portion; and vertically spaced apart conveyor means including means therein for collecting and moving the upper portions of the stalks outwardly of the harvesting unit and for collecting and moving the ear-bearing portions to a collecting unit.

4. Harvesting mechanism on a corn harvester having a main frame adapted to move over a field of row-planted ear-bearing corn stalks comprising: a pair of elongated and longitudinally extending members mounted on the frame and spaced apart laterally to form a stalk passage for successively receiving the stalks as the harvester moves forwardly, said passage being sufficiently narrow to prevent ears of corn from passing therebetween; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members; stalk cutting means supported on the frame above and adjacent the elongated members and operative to sever stalks adjacent the butt end of the ear and substantially an ear-length above the butt end of the ear, said cutting means thereby dividing each of the stalks into a central ear-bearing portion, an upper portion, and a lower portion; and vertically spaced apart conveyor means on the frame including means therein separating upper and lower conveyors for preventing intermingling of materials in the respective conveyors, the upper conveyor including means therein for collecting and moving the upper portions of the stalks outwardly of the harvesting unit, the lower conveyor including means therein for collecting and moving the ear-bearing portions to a collecting unit.

5. Harvesting mechanism on a corn harvester having a main frame adapted to move over a field of row-planted ear-bearing corn stalks comprising: a pair of elongated and longitudinally extending members mounted on the frame and spaced apart laterally to form a stalk passage for successively receiving the stalks as the harvester moves forwardly, said passage being sufficiently narrow to prevent ears of corn from passing therebetween; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members to thereby position the central ear-bearing portions of the stalks uniformly relative to the members; stalk cutting means supported on the frame above and adjacent the elongated members and operative to sever the central ear-bearing portions from the upper and lower portions of the stalk; and conveyor means on the frame collecting and moving the ear-bearing portions to a collecting unit.

6. Harvesting mechanism on a corn harvester having a main frame adapted to move over a field of row-planted ear-bearing corn stalks comprising: a pair of forwardly extending and cooperative rotatable rolls positioned in side opposed relationship mounted on the frame and operative to engage the stalks moving through the harvester to draw the stalks downwardly; means engaging the ears on the stalks to limit downward movement of the ear bearing portion of the stalks as they move through the harvester; stalk cutting means supported on the frame cooperative with the means engaging the ears to sever the central ear-bearing portions of the stalks from the upper and lower portions of the stalks; and conveyor means on the frame collecting and moving the ear-bearing portions to a collecting unit.

7. The invention defined in claim 6, in which the means engaging the stalks is in the form of a pair of rigid elongated members positioned on opposite sides of the passage and normally beneath the ear-bearing portions of the stalks, and spaced laterally apart sufficiently to permit passage of the stalks but restricting passage of the ears, and the pair of cooperative rotatable rolls are positioned on opposite sides of the passage and beneath the rigid elongated members and engage the stalks to draw them downwardly until the butt ends of the ears engage and are restricted by the elongated members.

8. The invention defined in claim 7, further characterized by said stalk cutting means being composed of a rigid cutting unit having spaced apart cutting elements, said cutting unit being mounted on the frame for rotation about a vertically disposed axis and having said cutting elements extending radially and spaced axially apart, the lower of said elements being proximate to the elongated members for severing the stalk substantially adjacent to the butt end of the ear and the upper cutting element severing the stalk sufficiently above the butt end of the ear to prevent contact between the ear and the upper element.

9. Harvesting mechanism on a corn harvester having a main frame adapted to move over a field of row-planted ear-bearing corn stalks comprising; a pair of elongated and longitudinally extending members mounted on the frame and spaced apart laterally to form a stalk passage for successively receiving stalks as the harvester moves forwardly, said passage being sufficiently narrow to prevent ears of corn from passing therebetween; gathering means mounted on the frame and extending forwardly to gather and guide successive stalks into and rearwardly through the aforesaid stalk passage as the harvester moves over the field; a pair of forwardly extending and cooperative rotatable rolls positioned in side opposed relationship mounted on the frame beneath the stalk passage and operative to engage the stalks moving through the passage to draw the stalks downwardly to a position whereby the butt end of the ears abut the elongated members; a discharge elevator supported on the frame and having an intake end spaced laterally from the stalk passage; a pair of verticlly spaced apart upper nd lower cutting elements mounted on the frame adjacent of the passage, the lower of said elements being proximate to the elongated members and operative to sever the stalk adjacent the butt end of the ear, and the upper cutting element being operative to sever the stalk substantially an ear-length from the lower cutting element, said cutting elements thereby dividing the stalk into a central ear-bearing portion, an upper portion, and a lower portion; and vertically spaced apart conveyor means on the frame including means therein separating upper and lower conveyors for preventing intermingling of materials in the respective conveyors, the upper conveyor including means therein for collecting and moving the upper portions of the stalks outwardly of the harvesting unit, the lower conveyor including means therein for moving the ear-bearing portion laterally to the intake end of the discharge elevator.

10. The invention defined in claim 9, in which the cutting elements are rotary blades spaced vertically apart and operating about a common axis inclined toward the discharge elevator.

References Cited in the file of this patent

UNITED STATES PATENTS

| | | |
|---|---|---|
| 1,808,266 | Spell | June 2, 1931 |
| 2,288,915 | Morral et al. | July 7, 1942 |
| 2,380,161 | Flook | July 10, 1945 |
| 2,716,321 | Schaaf et al. | Aug. 30, 1955 |